No. 703,448. Patented July 1, 1902.
A. McKINLEY.
NUT LOCK.
(Application filed Sept. 7, 1901.)
(No Model.)
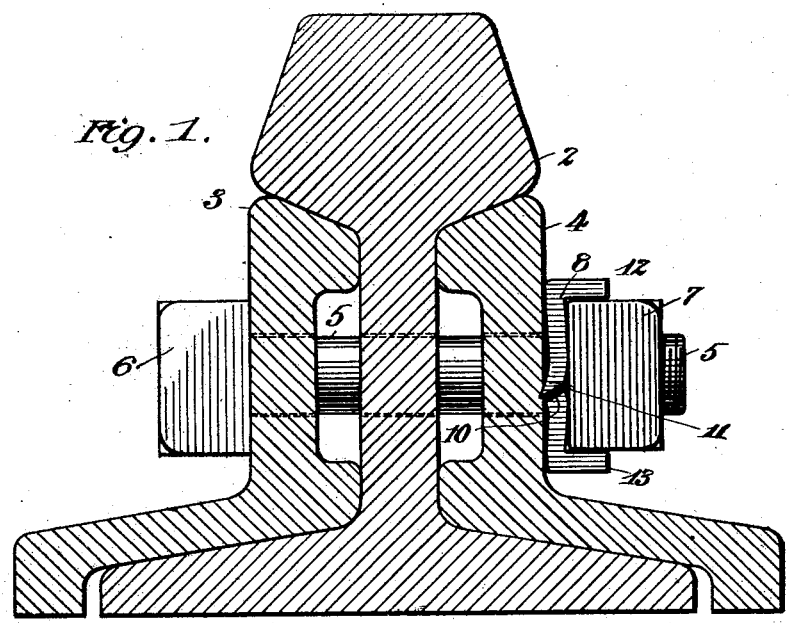
Fig. 1.
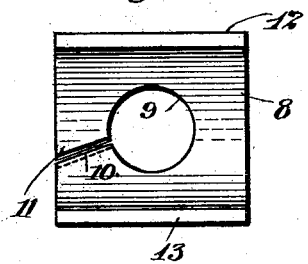
Fig. 2.
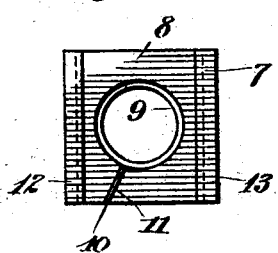
Fig. 4.
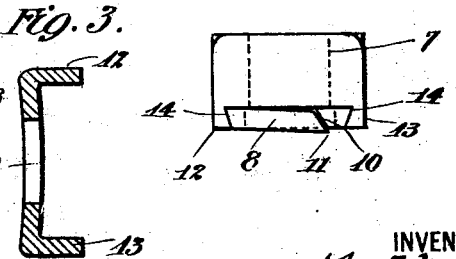
Fig. 3.
Fig. 5.
WITNESSES:
INVENTOR
Andrew McKinley.
BY Willie Fowler.
ATTORNEY

UNITED STATES PATENT OFFICE.

ANDREW McKINLEY, OF NEW YORK, N. Y.

NUT-LOCK.

SPECIFICATION forming part of Letters Patent No. 703,448, dated July 1, 1902.

Application filed September 7, 1901. Serial No. 74,655. (No model.)

*To all whom it may concern:*

Be it known that I, ANDREW McKINLEY, a citizen of the United States, residing in the borough of Manhattan, New York city, county and State of New York, have invented certain new and useful Improvements in Nut-Locks, of which the following is such a full, clear, and exact description as will enable any one skilled in the art to which it appertains to make and use the same, reference being had to the accompanying drawings, forming part of this specification.

My invention relates to a spring-washer which is adapted to be interposed between a plate or member through which a screw-bolt passes and a nut which works on the screw-bolt for the purpose of preventing the nut from accidentally unscrewing when it is screwed home on the bolt.

The principal objects of the invention are to provide a simple and cheap form of spring-washer which will securely lock the nut, so as to prevent it from being unscrewed unless comparatively great force is used in such operation.

To these ends my invention consists in the various novel and peculiar arrangements and combinations of the several parts of the device, all as hereinafter fully described and then pointed out in the claims.

I have illustrated types of my invention in the accompanying drawings, wherein—

Figure 1 is a vertical transverse sectional view of an ordinary railway-rail and a pair of fish-plates with my improved nut-locking washer applied thereto. Fig. 2 is a plan view of my improved washer shown as detached and looking at the outer face thereof. Fig. 3 is a central transverse section of the washer shown in Figs. 1 and 2, the plane of the section being at right angles to the two upturned edges of the washer. Fig. 4 is an under side view of a modified form of the invention, in which the washer is set in the under side of the nut. Fig. 5 is a side view of the modified form of the invention shown in Fig. 4.

In the accompanying drawings, in which like numbers of reference designate like parts throughout, 2 is an ordinary railway-rail, upon opposite sides of which are placed fish-plates 3 and 4, respectively. A screw-bolt 5, having at one end a fixed head 6, is passed through suitable openings in the two fish-plates and the web of the rail, so that the head 6 bears against the outer face of one of the fish-plates, while the threaded end of the bolt projects out beyond the outer face of the other fish-plate. The nut 7 screws onto the bolt to bind the parts together.

In order to lock the nut 7 securely on the screw-bolt, I interpose between the member or fish-plate 4, against which the nut would ordinarily make impact, and the nut my improved form of spring-washer 8, which comprises a metallic spring plate or washer having the usual central opening 9 for the bolt to pass loosely through, and I form this plate with a so-called "transverse" cut 10 in one side thereof, which cut extends from the central opening 9 to the outer edge of the plate, so as to constitute practically a split collar. Instead of forming this cut in a plane containing or parallel with the axis of the opening of the washer I prefer to make it on a plane cutting such axis, so as to form the transverse edge with a point or tooth 11 upon the under side of the plate, and I also prefer to make the cut 10 on a plane other than normal to the side edge of the plate, as will be clearly understood from Figs. 2 and 4. This construction gives the tooth 11 a sharper point at the outer end than it would have if the cut were normal to the side edge. The transverse edge constituting the tooth 11 is bent slightly downwardly and projects beyond the plane of the plate, and the plate itself is bowed slightly upwardly, as will be understood from Figs. 1, 3, and 5, so that when the nut is turned down hard against the outer face of the plate or spring-washer the biting edge or tooth 11 is forced under spring-pressure against the member which the bolt binds, which in the illustration herewith given is the fish-plate 4. Two of the opposite edges of the plate are formed with outwardly-projecting flanges 12 and 13, respectively, which in the construction shown are provided by merely upsetting the edges of the plate, and these flanges are so spaced that the nut 7 fits snugly in between them.

In the use of the device above described the spring-washer 8 is placed over the bolt with the spring-tooth 11 thereof projecting inwardly, while the flanges 12 and 13 thereof project outwardly. The nut 7 is then applied and screwed on the bolt. At the same time the spring-washer is brought up against the inner face of the nut, and the nut is seated in between the flanges 12 and 13. As the nut is screwed home the washer being in fixed engagement with it turns with the nut, and as it is forced by the screwing of the nut against the member 4 the tooth 11 is carried backwardly over the surface of such member and is forced into the latter with greater pressure at each turn of the nut, so that when the nut is finally screwed home the tooth or biting edge 11 of the washer bears with considerable pressure against the metal of the member 4 and causes it to bite or dig into the same. This condition will prevent the nut 7 from being unscrewed unless comparatively great force be used, for in unscrewing the nut the washer 8 turns in fixed relation therewith, which movement causes the tooth 11 to be forced forwardly over the metal into which it bites, and it is for this reason that considerable force is required to unscrew the nut.

In Figs. 4 and 5 I show a modified form of the invention, in which the side flanges 12 and 13 for keeping the washer and nut in fixed relation are applied to the under face of the nut itself instead of to the washer, and the washer is slipped in between these flanges. When thus constructed, the flanges are undercut, as at 14, and the corresponding side edges of the washer are beveled accordingly to fit the undercut to prevent the washer from dropping away from the nut. In this construction the operation of the spring-washer is the same as that already described, and when the nut is screwed home the biting edge 11 of the washer will dig into the metal of the member 4 whenever the nut starts to unscrew, and this tends to keep the nut locked in position on the bolt.

In practice I have found that the above-described construction of washer locks the nut so fast to the bolt when screwed home that comparatively great force must be applied to the nut in order to unscrew it, and in many instances the necessary force has been so great as to break the flange 12 or 13 before the nut could be started. In order to avoid thus mutilating the washer, I prefer to loosen the parts by grasping the head 6 of the screw-bolt and turning the bolt in the nut, which operation may be readily performed.

It is obvious that my improved form of nut-locking washer may be applied to any structure in which the nut and bolt or like member are used to bind certain parts together, though I have only illustrated an ordinary railroad-rail and its fish-plates. It will be noted that in both forms of the invention herewith set forth the entire length of the biting edge or tooth 11 cuts into the metal of the member against which it is pressed.

I wish to be understood as not limiting my invention to the specific construction herewith shown, for it is manifest that modifications may be made in the different parts thereof without, however, departing from the spirit of the invention.

Having thus described my invention, what I claim, and desire to secure by Letters Patent, is—

1. The combination of a nut, and a spring-washer adapted to be detachably fastened to the nut so as to turn therewith, the said washer being formed with a transverse cut extending through the same and having one of the transverse edges adjacent to said cut formed with an inwardly-projecting tooth adapted to bite into the flat surface of the member against which the nut jams the washer to hold the nut fast, and fixed projections or flanges arranged between the nut and washer by means of which the two may be detachably fastened together for holding them in fixed rotary relation, substantially as and for the purpose set forth.

2. The combination of a nut, and a spring-washer 8 adapted to be detachably fastened to the nut so as to turn therewith, the said washer being formed with a transverse cut 10 extending through the same and having one of the transverse edges adjacent to said cut formed with an inwardly-projecting tooth 11 adapted to bite into the flat surface of the member against which the nut jams the washer to hold the nut fast, and fixed projections or flanges 12 and 13 formed upon opposite edges of the washer for engaging two opposite sides of the nut, substantially as and for the purpose set forth.

3. The combination of a nut, and a bowed or arched spring-washer adapted to be detachably fastened to the nut so as to turn therewith, the said washer being provided with a tooth for engaging and biting into the flat surface of the member against which the nut jams to hold the nut against backward rotation, substantially as and for the purpose set forth.

In testimony whereof I have hereunto set my hand in the presence of the two subscribing witnesses.

ANDREW McKINLEY.

Witnesses:
WILLIS FOWLER,
SAMUEL M. CHESNUT.